United States Patent [19]
von der Heide et al.

[11] Patent Number: 4,734,603

[45] Date of Patent: Mar. 29, 1988

[54] MOTOR CONTROL MOUNTING

[75] Inventors: Johann von der Heide, Schramberg; Georg F. Papst; Rolf Mueller, both of St. Georgen, all of Fed. Rep. of Germany

[73] Assignee: Papst-Motoren GmbH & Co. KG, Black Forest, Fed. Rep. of Germany

[21] Appl. No.: 870,470

[22] Filed: Jun. 4, 1986

[30] Foreign Application Priority Data

Jun. 4, 1985 [DE] Fed. Rep. of Germany ....... 3519901

[51] Int. Cl.⁴ .......................................... H02K 29/08
[52] U.S. Cl. .................................. 310/72; 310/68 B; 310/214
[58] Field of Search .............. 310/67 R, 68 B, 69, 310/72, 214, DIG. 6, 71, 254

[56] References Cited

U.S. PATENT DOCUMENTS 4,539,499  9/1985  Punch et al. ...................... 310/214
4,549,104  10/1985  Nimura et al. ..................... 310/67 R

FOREIGN PATENT DOCUMENTS 58-49074  3/1983  Japan ............................... 310/68 B Primary Examiner—Patrick R. Salce
Assistant Examiner—D. L. Rebsch
Attorney, Agent, or Firm—Fitch, Even, Tabin & Flannery

[57] ABSTRACT

To lessen mounting time and to optimize positioning of the Hall generator, the Hall generator and control electronics influenced by the generator so as to actuate a brushless dc motor are arranged on a common substrate and are provided with a common protective envelope whose dimensions are somewhat narrower than the cross-section of the motor slot. This substrate is inserted in the motor slot so that the Hall generator is located outside the slot and in the effective magnetic field of the motor's permanent magnet.

4 Claims, 3 Drawing Figures

MOTOR CONTROL MOUNTING

MOTOR CONTROL

The present invention concerns a brushless dc motor provided with electronic controls influenced by a Hall generator.

Motors of this type are provided with a means of detecting the position of the rotor, which takes the form of a Hall generator, and they are also provided with electronic amplification to generate the signal from the Hall device which is employed to regulate rotor speed.

Hall generators are typically positioned where the rotary magnetic field will generate a signal giving the least interference. The electronic controls are normally arranged on a mounting board which is in turn connected to the stator.

Mounting the above individual elements does not usually give rise to further problems, but it is a time-consuming task, and consequently any means of reducing assembly time will have a considerable effect on the cost of motors of the aforesaid type. The space envelope required for the mounting plate will also play an important part, since this will generally be of critical concern in the design of electronic motors.

Optimizing the location of the Hall device is a further problem in this context.

If the Hall device is arranged too far outside the permanent magnet field, the latter will exert too weak an effect, whereas a very strong influence will be exerted by stray fields from the field coil.

The arrangement of the main sensing surface of the Hall device in a radial direction, which will generally be imposed by the dimensions of the generator and the positioning of the mounting plate, will tend to degrade the signal/noise ratio because the influence of the permanent magnet field will then run parallel to the main sensing surface of the Hall generator, thus inducing a very low Hall voltage. In such cases, the stray field will be oriented more or less vertically with respect to the main sensing surface of the Hall generator; consequently, control signals will be subjected to strong interference and will be of low amplitude.

Hence, the task of the present invention is to provide an arrangement combining lower mounting costs and enhanced motor control.

This problem is resolved in the present invention by arranging the Hall generator and the motor control electronics which are under the influence of the generator on a single substrate provided with a common protective envelope whose external dimensions are somewhat narrower than the motor slot cross-section, whereby the substrate is inserted in the motor slot so that the Hall generator can be positioned outside the slot but within the effective range of the permanent magnet of the motor.

One advantage of this arrangement is that it provides internal electric connections between the Hall generator and the electronics of the control unit, thus obviating the need for further wiring, apart from that required for the power supply and regulation of the motor. The familiar bonding method is used for the internal wiring which is, generally speaking, adequately protected by the surrounding envelope.

This arrangement is merely inserted in the motor slot where it can be retained in position by the elasticity of the potting material itself or by other flexible means, without the need for other mounting aids.

The main advantage of this arrangement is that it provides a space-saving means of locating the Hall generator in the stator in the upper part of the rotor housing of a motor provided with an external rotor. In this area, the permanent magnet field is very strong, whereas the stray field will be very weak, and the arrangement is almost completely protected against outside influences.

Furthermore, no additional space envelope is required to accommodate the controls.

In a further development of the present invention, the supply leads to the motor and regulation system are firmly connected and potted together with the control unit.

In an other further development, the control unit is inserted in a special frame adapted to the motor slot to which it is connected with metal lugs.

The invention will now be elucidated with the help of the following drawings, where:

Figure 1:
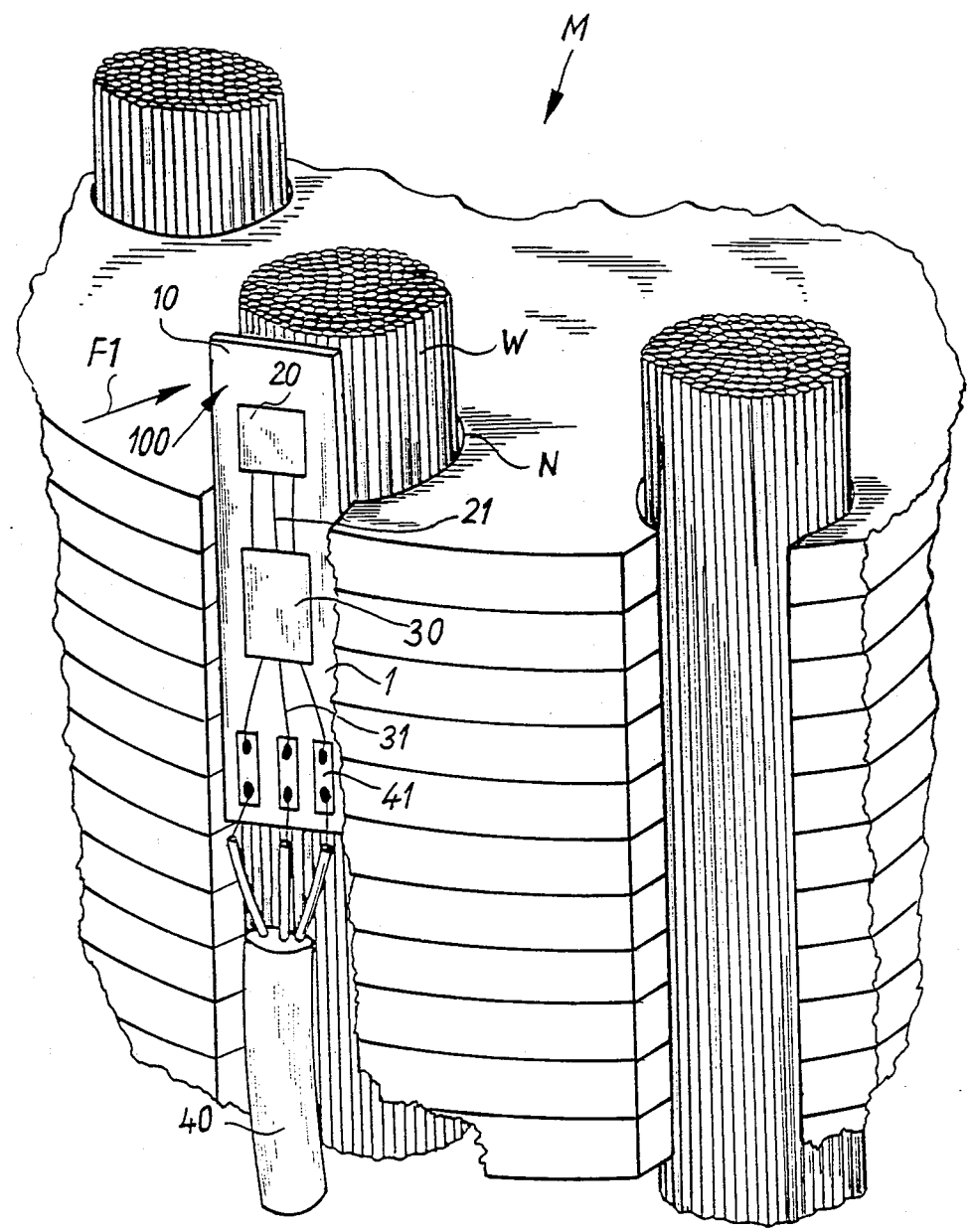
FIG. 1 shows a control unit positioned in the motor slot

FIG. 1 shows a Hall generator 20 mounted on a substrate 10 and an electronic amplifier 30 arranged separately. The Hall generator is arranged on a chip of A3B5 compound and is connected to the amplifier 30 by means of bonding wiring 21. The entire arrangement is housed inside a plastic protective envelope 100.

If the Hall device is built up on a silicon chip, the Hall generator and the amplifier can both be arranged on a single chip. In this case, the bonding wiring can be omitted.

The supply and output leads from the amplifier are run in bonding wiring 31 to the solder support points 41, to which can be connected the power leads 40 from the power supply (not shown) and from a capacitor as well, if needed.

The entire control unit 1 is inserted in a slot N in the winding W of the motor M, in which it is potted in varnish, for example. The Hall generator projects above the slot in this case.

The permanent magnet field F1 impinges perpendicularly on the Hall generator 20 in its position at the mouth of the slot, whereas the stray field at the end of the slot is oriented almost parallel to the slot axis. In this way, the Hall generator produces a strong signal, free of interference, thus obviating the need for high level amplification. A particular advantage of this arrangement is that it allows the use of a Hall generator of one-piece design built up on a silicon chip, whereby the Hall voltage will be lower than if an A3B5 chip were used.

This advantage which derives from the method of mounting the Hall generator is particularly distinct if the control unit is mounted in the upper part of the slot of a motor provided with an external rotor. This position is only accessible over the stator stack. The distinctive feature in this case is that the Hall generator is protected as fully as possible from the effects of any outside fields. Compared with traditional designs employing mounting boards, the present invention not only allows considerable cost savings, but also saves a great deal of space, which is of particular importance in the design of motors in apparatus and appliance applications.

Figure 2:
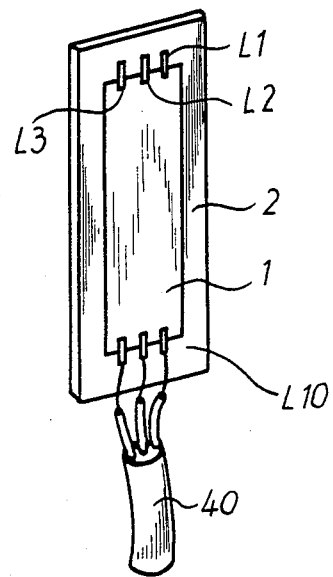
FIG. 2 shows a control unit provided with a frame and power supply leads

FIG. 2 shows a substrate 1 soldered in a frame 2. This frame is flexible and fits in the slot of the motor employed in this case. This arrangement allows the same control unit 1 to be fitted to various types of motor. The control unit is fastened to the frame 2 by means of metal lugs L1, L2, . . . L10.

Figure 3:
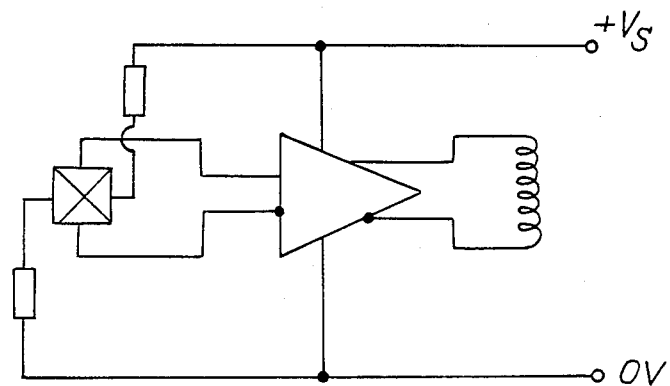
FIG. 3 shows a motor control circuit

The electric functions of the arrangement according to the present invention is shown in FIG. 3. In this instance, the motor winding W is driven by the driving amplifier 30 which is supplied with control signals by the Hall generator 20. The power supply for this arrangement is indicated at Vs and OV.

What is claimed is:

1. A brushless d.c. motor having a rotor with a magnetic field, a stator, slots in the stator having a given width and cross section, a winding system held in the cross section of the slots of the stator, electronic controls controlling current in the winding system and a Hall device detecting the position of the rotor and providing a control signal for the electronic controls to regulate the motor, the motor further comprising an elongated substrate mounting both the Hall device and the associated electronic controls; an envelope enclosing in common the substrate, the Hall device, and the electronic controls, the width of the combined envelope and substrate being less than the given width of the cross section of the slots, the Hall device being mounted on the elongated substrate adjacent one of its ends, and the combination envelope with substrate, Hall device and electronic controls being disposed within the cross-sectional area of one of the motor slots and with the Hall device end extending outside the slot but within the magnetic field of the rotor, whereby the Hall device is able to provide an effective control signal substantially interference free in response to the magnetic field of the rotor.

2. A motor in accordance with claim 1 further comprising power leads to the motor being firmly connected to the control electronics from the end of the elongated substrate opposite the Hall device end, the connections being on the substrate within the slot and within the enclosure of the envelope.

3. A motor in accordance with claim 1 further comprising a frame for containing the combination substrate, Hall device, electronic controls and envelope, and means physically connecting the frame to the substrate.

4. A motor in accordance with claim 2 further comprising a frame for containing the combination substrate, Hall device, electronic controls, motor leads connections and envelope, and means physically connecting the frame to the substrate.

* * * * *